(12) United States Patent
Kikuti (10) Patent No.: US 7,197,836 B2
(45) Date of Patent: Apr. 3, 2007

(54) REFERENCE COORDINATE CALCULATING METHOD, REFERENCE COORDINATE CALCULATING PROGRAM, RECORDING MEDIUM THEREOF, REFERENCE PLATE AND FORM MEASURING MACHINE

(75) Inventor: Naoya Kikuti, Kawasaki (JP)

(73) Assignee: Mitutoyo Corporation, Kawasaki-shi (JP)

( * ) Notice: Subject to any disclaimer, the term of this patent is extended or adjusted under 35 U.S.C. 154(b) by 27 days.

(21) Appl. No.: 11/200,366

(22) Filed: Aug. 9, 2005

(65) Prior Publication Data
US 2006/0026852 A1    Feb. 9, 2006

(30) Foreign Application Priority Data
Aug. 9, 2004    (JP)    ............... 2004-232401

(51) Int. Cl.
    *G01B 5/20*    (2006.01)
(52) U.S. Cl. .................. 33/555; 33/551; 33/503; 33/1 CC
(58) Field of Classification Search ............ 33/551, 33/503, 549, 552, 553, 554, 555, 1 CC; 702/33, 702/94, 95, 150, 152, 153
    See application file for complete search history.

(56) References Cited

U.S. PATENT DOCUMENTS

| | | | | |
|---|---|---|---|---|
| 4,166,323 A | * | 9/1979 | Maag | ............... 33/551 |
| 4,593,476 A | * | 6/1986 | Clark et al. | ............... 33/551 |
| 5,193,286 A | * | 3/1993 | Collier | ............... 33/551 |
| 5,456,019 A | * | 10/1995 | Dowell et al. | ............... 33/555 |
| 5,829,151 A | * | 11/1998 | Collier et al. | ............... 33/549 |

FOREIGN PATENT DOCUMENTS

| | | |
|---|---|---|
| JP | 06-207829 | 7/1994 |
| JP | 11-006728 | 1/1999 |
| JP | 2001-227940 | 8/2001 |

* cited by examiner

*Primary Examiner*—Christopher W. Fulton
*Assistant Examiner*—V Brown
(74) *Attorney, Agent, or Firm*—Rankin, Hill, Porter & Clark LLP (57) ABSTRACT

Positions of a plurality of reference points arranged on a reference plate (200) having a larger area than a measurement area of a measuring machine (300) are obtained as coordinate points on a standardized reference coordinate system. First, the plurality of reference points are grouped according to the measurement area of the measuring machine (300). At this time, the reference points are grouped so that one of the groups shares a predetermined number or more of the reference points with the other one of the groups (a grouping step). The reference points are measured for each of the groups (a measuring step). A coordinate transformation function is calculated for each of the groups, the coordinate transformation function respectively transforming values of the reference points which are shared by the different groups and obtained by measuring the reference points in the different groups into the same or extremely approximate coordinate points (a reference point coordinate transformation function calculating step). The coordinates of the positions of the respective reference points measured for each of the groups are transformed with the coordinate transformation functions respectively calculated for the groups (a coordinate transformation processing step).

19 Claims, 7 Drawing Sheets

REFERENCE COORDINATE CALCULATING METHOD, REFERENCE COORDINATE CALCULATING PROGRAM, RECORDING MEDIUM THEREOF, REFERENCE PLATE AND FORM MEASURING MACHINE

BACKGROUND OF THE INVENTION

1. Field of the Invention

The present invention relates to a reference coordinate calculating method, a reference coordinate calculating program, a recording medium thereof, a reference plate and a form measuring machine. In particular, the present invention relates to a reference coordinate calculating method or the like for obtaining a position (coordinates) of each of reference points provided on a large area as a coordinate point on a standardized reference coordinate system.

2. Description of Related Art

Conventionally, the form of a workpiece (an object to be measured) is measured by a coordinate measuring machine. However, a measurement area is limited within a platform of the coordinate measuring machine, and consequently the measurable size of the workpiece is limited.

In order to extend the measurement area, for instance, a method disclosed in Reference (JP11-6728A) has been known.

In this method, a movable measuring machine and a plurality of reference points of which coordinate values have already been obtained are prepared. Then, the form of the workpiece is measured by the movable measuring machine while the movable measuring machine is moved corresponding to a portion to be measured of the workpiece. Besides, a position of the movable measuring machine is obtained based on the measurement results of the respective reference points. The entire form of the workpiece can be obtained by combining measurement data obtained when the workpiece is measured by the measuring machine with the position of the measuring machine in each measurement timing.

However, when groups of the reference points are set for obtaining the position of the movable measuring machine, the coordinates of the respective reference points have been measured and registered by the measuring machine (the coordinate measuring machine) including all of the reference points within the measurement area. Therefore, the measuring machine had to be extremely large. It is difficult to prepare such large measuring machine, requiring enormous cost as well as a large space for installing the measuring machine, for example, as a typical plant facility.

SUMMARY OF THE INVENTION

An object of the present invention is to provide a reference coordinate calculating method for determining coordinates of reference points in an area larger than a measurement area of a measuring machine, a reference coordinate calculating program and a recording medium thereof, as well as a reference plate for measuring a workpiece in the area larger than the measurement area of the measuring machine and a form measuring machine.

A reference coordinate calculating method according to an aspect of the present invention for obtaining positions of a plurality of reference points arranged on a reference plate having a larger area than a measurement area of a measuring machine as coordinate points on a standardized reference coordinate system, the method includes the steps of: a grouping step in which the reference points included in a measurable area of the measuring machine without a position of the measuring machine being moved are grouped as a group so that one of the groups in which the plurality of reference points are grouped shares at least three of the reference points with at least the other one of the groups; a measuring step in which the measuring machine measures the positions of the reference points for each of the groups; a reference point coordinate transformation function calculating step in which a reference point coordinate transformation function is calculated for each of the groups, the reference point coordinate transformation function respectively transforming the positions of the reference points which are shared by different groups and obtained by measuring the reference points in the different groups into the same or extremely approximate coordinate points; and a reference point coordinate transformation processing step in which coordinates of the positions of the reference points measured for each of the groups are transformed with the reference point coordinate transformation function calculated for each of the groups.

With this configuration, the reference points arranged on the large area are grouped, and thus the positions of the reference points measured for each of the groups may be transformed into the coordinate points on the reference coordinate system with the coordinate transformation function for each of the groups. Accordingly, regardless of the measurement area of the measuring machine, the coordinates of the reference points in the large area may be calculated as the points on the reference coordinate system. Therefore, there is no need to prepare a large measuring machine for covering all of the reference points in the measurement area, thereby effectively lowering the cost. Additionally, since the size of the area where the reference points are arranged will no longer be restricted, the reference points may be provided on the large area as required, so that the positions of the reference points are obtained as the coordinate points on the reference coordinate system.

Incidentally, in the grouping step, a user may group the reference points to meet with the requirement described in the claim with regard to the relationship between the arrangement of the reference points and the measurement area of the measuring machine, or a part program may automatically group the reference points corresponding to the relationship between the arrangement of the reference points and the measurement area of the measuring machine.

A reference coordinate calculating method according to another aspect of the present invention for obtaining positions of a plurality of reference points arranged on a reference plate having a larger area than a measurement area of a measuring machine as coordinate points on a standardized reference coordinate system, the method includes the steps of: a grouping step in which the reference points included in a measurable area of the measuring machine without a position of the measuring machine being moved are grouped as a group so that one of the groups in which the plurality of reference points are grouped shares at least two of the reference points and a common plane with at least the other one of the groups; a measuring step in which the measuring machine measures the positions of the reference points as well as the common plane for each of the groups; a reference point coordinate transformation function calculating step in which a reference point coordinate transformation function is calculated for each of the groups, the reference point coordinate transformation function respectively transforming the positions of the reference points which are shared by different groups and obtained by measuring the reference points as well as the common plane in the different groups into the same or extremely approximate coordinate points;

and a reference point coordinate transformation processing step in which coordinates of the positions of the reference points measured for each of the groups are transformed with the reference point coordinate transformation function calculated for each of the groups.

Preferably, in the above reference coordinate calculating method, the positions of the reference points may be positions reflected on the common plane.

With this configuration, the same advantages as that of the above-described aspect of the present invention may be attained.

In other words, regardless of the measurement area of the measuring machine, the reference points coordinates of the plurality of reference points arranged on the large reference plate may be obtained as the points on the reference coordinate system.

In principle, when the common reference points shared by the groups are measured and the results obtained by measuring for each of the groups based on the coordinates of the common reference points are combined as the point on the standardized coordinate system, the number n of the common reference points are required between the groups in the n-dimensional coordinate system. However, in this aspect of the present invention, in order to obtain the coordinate points in which the positions of the reference points are reflected on the common plane as the reference point coordinates, since the number of the common reference points shared by the groups are set as two or more and the common plane of each group is measured, the same advantages as the case where the three common reference points are shared by the groups may substantially be attained, and thereby the coordinates of the reference points measured for each of the groups may be combined to the standardized coordinates even if the two common reference points are shared by the groups. As mentioned above, since only the two common reference points are required to be shared by the groups, the requirement is eased up for grouping as compared to the case of the three common reference points, thus easily grouping the reference points.

Incidentally, the positions of the reference points do not have to be the coordinates reflected on the common plane, and the coordinate transformation may be executed by obtaining the reference point coordinate transformation function for each of the groups based on the positions of the two reference points as well as the position on the reference plane.

The common plane may be a reference plane of the reference plate. And, the reference point may be defined by the center of a perfect sphere fitted in a hole formed on the reference plane or by the apex of a conic hole formed on the reference plane. The reference point coordinates may thus be defined for the respective reference points by reflecting the reference points provided in the above manner on the reference plane.

When the center of the perfect sphere is defined as the reference point, four points on the surface of the sphere may be measured for calculating the center coordinates of the sphere. Besides, the common plane may be obtained by measuring three arbitrary points nonlinearly located on the reference plane.

A reference coordinate calculating method according to yet another aspect of the present invention for obtaining positions of a plurality of reference points of a two-dimensional coordinate system arranged on a reference plane having a larger area than a measurement area of a measuring machine as coordinate points on a standardized reference coordinate system, the method includes the steps of: a grouping step in which the reference points included in a measurable area of the measuring machine without a position of the measuring machine being moved are grouped as a group so that one of the groups in which the plurality of reference points are grouped shares at least two of the reference points with at least the other one of the groups; a measuring step in which the measuring machine measures the positions of the reference points for each of the groups; a reference point coordinate transformation function calculating step in which a reference point coordinate transformation function is calculated for each of the groups, the reference point coordinate transformation function respectively transforming the positions of the reference points which are shared by different groups and obtained by measuring the reference points in the different groups into the same or extremely approximate coordinate points; and a reference point coordinate transformation processing step in which coordinates of the positions of the reference points measured for each of the groups are transformed with the reference point coordinate transformation function calculated for each of the groups.

With this method, the same advantages as that of the above-described aspect of the present invention may be attained. In other words, regardless of the measurement area of the measuring machine, the positions of the reference points arranged on the large reference plate may be calculated as the points on the reference coordinate system.

Note that, since the reference point is the point on the two-dimensional coordinate system, the number of the common reference points shared by the groups may be two.

The measuring machine employing the reference point on the two-dimensional coordinate system may be an image measuring machine.

Preferably, in the above reference coordinate calculating method, the reference point coordinate transformation function calculating step may obtain a deviation between: each of the coordinate points in which the coordinates of the positions obtained by measuring the common reference points in the different groups are respectively transformed with the coordinate transformation function; and an arithmetic mean of the coordinate points, and may calculate the reference point coordinate transformation function that makes the sum of squares of the deviation the least.

With this configuration, the reference point coordinate transformation function may be obtained with a least square method.

A reference coordinate calculating program according to a further aspect of the present invention instructs a computing unit to execute the respective steps of the above-described reference coordinate calculating method. In other words, the program instructs the computing unit to execute the grouping step, the reference point coordinate transformation function calculating step and the reference point coordinate transformation processing step.

A recording medium according to a still further aspect of the present invention stores the above-described reference coordinate calculating program in a manner readable by a computing unit.

With this configuration, the same advantages as that of the above-described aspect of the present invention may be attained. In other words, regardless of the measurement area of the measuring machine, the coordinates of the reference points in the large area may be calculated as the points on the reference coordinate system. Accordingly, there is no need to prepare a large measuring machine for covering all of the reference points in the measurement area, and the positions of the reference points may be obtained as the coordinate points on the reference coordinate system by providing the reference points on the large area as required.

Further, if the program is configured for instructing a computing unit including a CPU (a central processing unit) and a memory (a storing device) to execute the respective steps, parameters in the respective steps may easily be modified.

For example, in the grouping step, it is easy to change the number of the common reference points shared by the groups, and the interval when arranging the reference points as well as the measurement area of the measuring machine by input operation. Additionally, in the reference point coordinate transformation function calculating step, the calculating method for calculating the reference point coordinate transformation function for each of the groups may easily be changed to various calculating methods other than the least square method.

The recording medium storing the program may directly or indirectly be installed to the computer unit, or alternatively, a reading device for reading information in the recording medium may externally be connected to the computing unit to install the program in the computing unit through the reading device. Or, the program may be acquired and installed to the computing unit wirelessly or through a communication line such as the Internet, LAN cable or telephone line.

Further, the programming language for scripting the program may be any, namely, the language may be the assembler or compiler and may be written in text form or graphical form, besides, the language processing state may be based on the source code, intermediate code in interpreter form or object code.

A reference plate according to a yet further aspect of the present invention having a plurality of reference points of which positions are obtained as coordinate points on a standardized reference coordinate system with the reference coordinate calculating method.

With this configuration, since the reference coordinate calculating method is not limited within the area where the reference points are arranged, the reference plate may be the one having the reference points in the large area as required. As a result, for instance, the reference plate may be preferable for measuring a large workpiece such as a car or an airplane. Since the reference coordinate calculating method is low-cost without an independent large measuring machine, a large reference plate may be manufactured with low cost.

Note that, the reference plate is not limited to a table on which the reference points are arranged, and may be a floor on which the reference points are arranged.

A form measuring machine according to a yet further aspect of the present invention includes: the above-described reference plate; and a measuring machine movable on the reference plate.

With this configuration, the workpiece is placed on the reference plate having the reference points on the large area, and measured with the measuring machine while the position of the measuring machine is recognized based on the respective reference points. Owing to this, a workpiece larger than the measurement area of the measuring machine can be measured.

And, since the measuring machine for measuring the workpiece may be used when the positions of the reference points arranged on the reference plate are calculated and registered as the points on the reference coordinate system, the cost can remarkably be lowered.

DETAILED DESCRIPTION OF PREFERRED EMBODIMENTS

An embodiment of the present invention will be described below with attached drawings in reference to numeric references assigned to respective components in the drawings.

First Embodiment

A first embodiment of a form measuring machine according to the present invention will be described.

First, the configuration of the form measuring machine will be explained.

Figure 1:
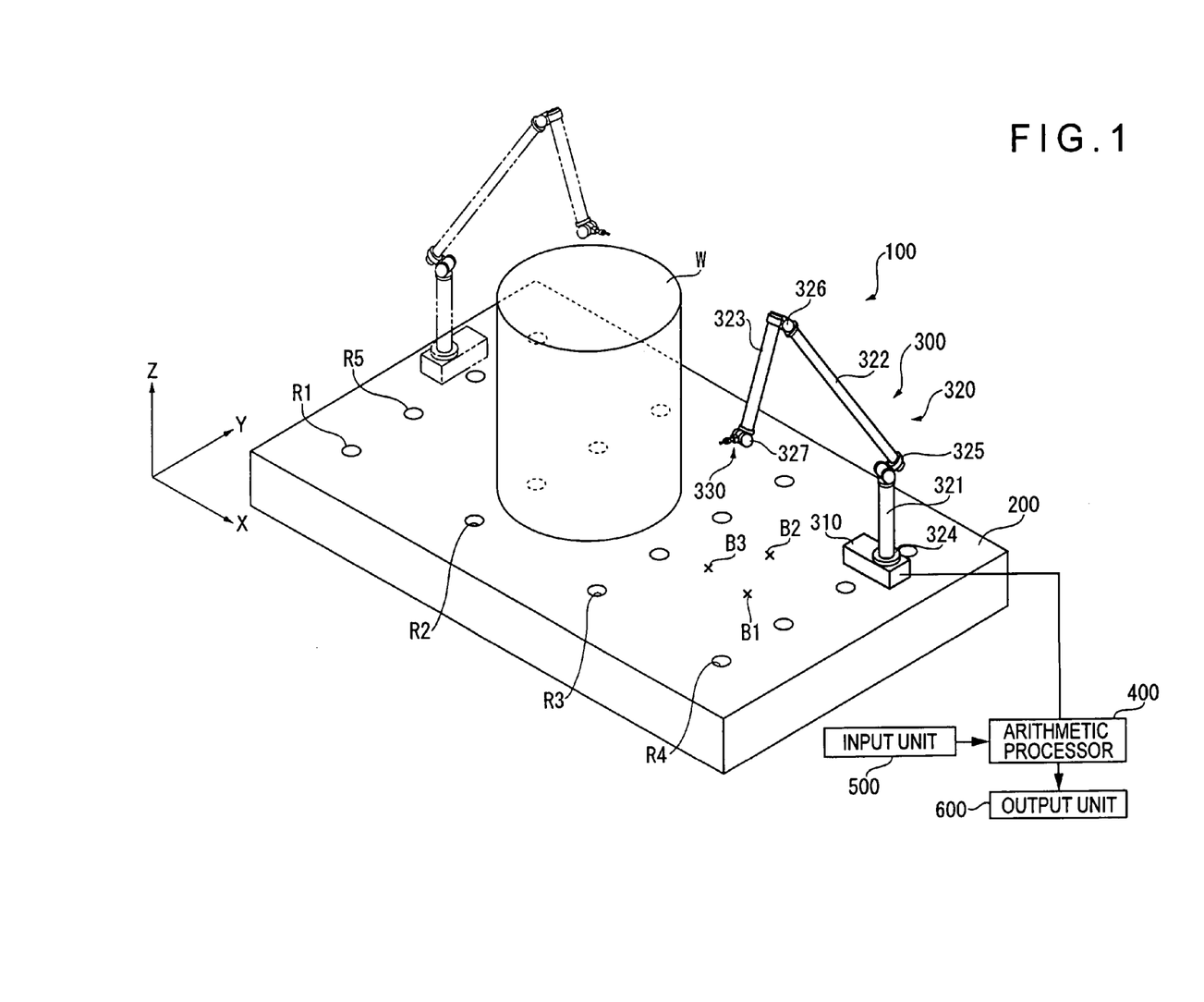
FIG. 1 is an illustration entirely showing a form measuring machine according to a first embodiment of the present invention.
Figure 2:
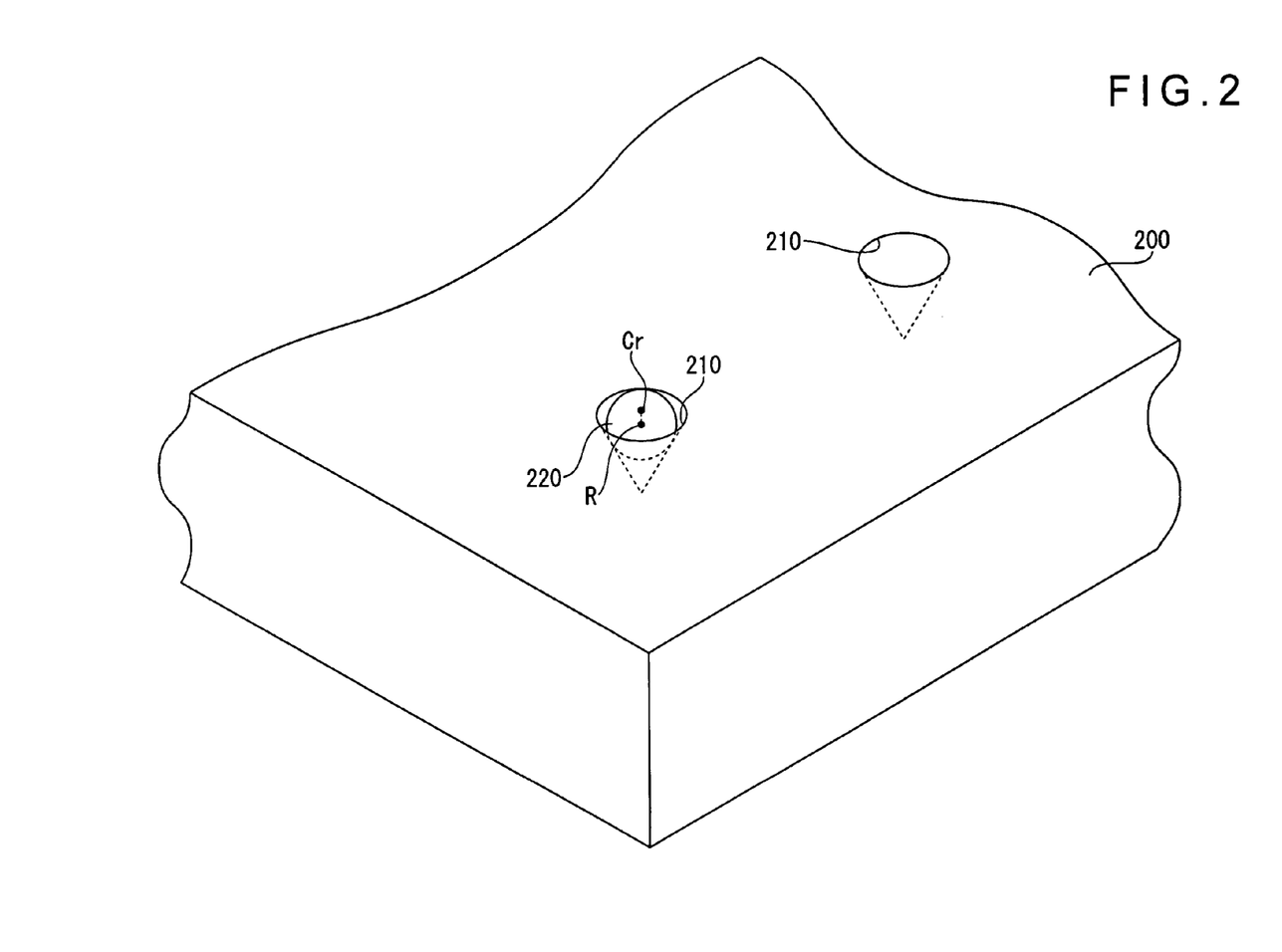
FIG. 2 is an illustration showing the structure of reference points of a reference plate of the aforesaid embodiment.
Figure 3:
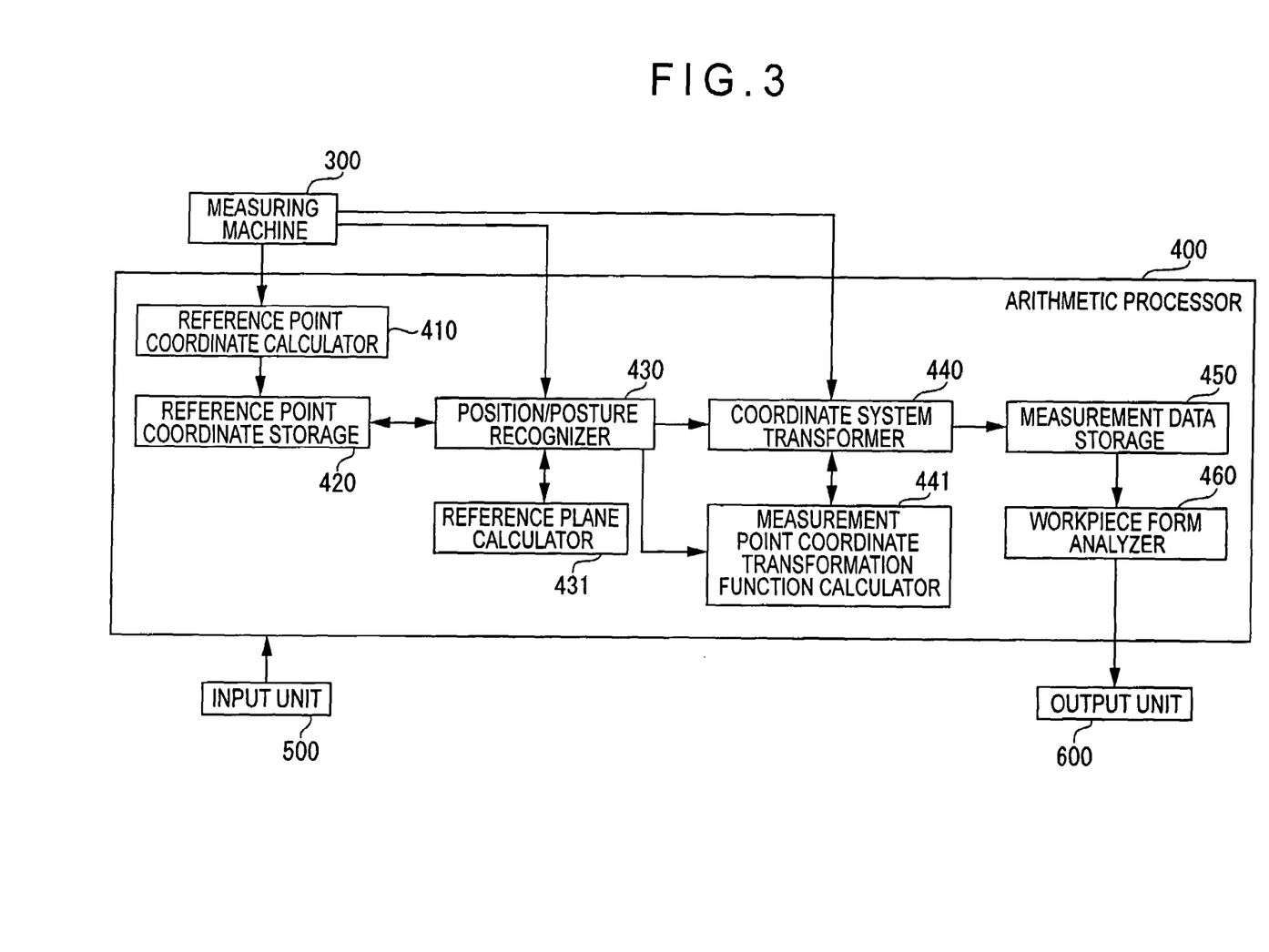
FIG. 3 is an illustration showing the configuration of an arithmetic processor of the aforesaid embodiment.

FIG. 1 is an illustration entirely showing the configuration of the form measuring machine, FIG. 2 is an illustration showing the structure of reference points of a reference plate, and FIG. 3 is an illustration showing the configuration of an arithmetic processor.

A form measuring machine 100 includes a reference plate 200, a measuring machine 300, an arithmetic processor 400, an input unit 500 and an output unit 600.

The reference plate 200 is a large reference plate, for instance, with a side exceeding 2 m. A workpiece (an object to be measured) W and the measuring machine 300 are placed on the reference plate 200.

A plurality of reference points R are provided on the reference plate 200.

The reference points R are disposed, for example, in grid pattern on the reference plate 200, in which the number, 6 multiplied by 6, of the reference points R are arranged with 400 mm pitch. More specifically, conical holes 210 are formed on the reference plate 200 so that a reference ball 220 machined to be a perfect sphere can fit therein (see FIG. 2), and the center point of the reference ball 220 fitted in the hole 210 is considered as the position of each reference point R.

In the present embodiment, a coordinate value where the center point of the reference ball 220 is perpendicularly reflected on a reference plane is considered as a reference point coordinates Cr, so that the reference point coordinates Cr for each reference point R is obtained and stored as a coordinate point on a standardized reference coordinate system and a large workpiece is measured using the reference point coordinates.

In order to obtain the center point of the reference ball 220, for example, four arbitrary points on the surface of the reference ball 220 are measured, and the center coordinate value of the reference ball 220 is calculated based on the four points. Then, the reference point coordinates Cr for the reference point R can be obtained by reflecting the center point of the reference ball 220 on the reference plane which is determined by measuring three points nonlinearly located on the reference plate 200 (for example, $B_1$ to $B_3$ in FIG. 1).

The method, which is for obtaining the reference point coordinates for each reference point as a point on the reference coordinate system, will be described later with reference to FIGS. 4 to 7.

The measuring machine 300 is movable since it is portable or provided with casters for moving, and for instance, may be a multi-joint coordinate measuring machine. The measuring machine 300 is placed on the reference plate 200 and moved corresponding to a portion to be measured of the workpiece W.

The measuring machine 300 includes a mount 310, a movable arm 320 connected to the mount 310 so that the movable arm 320 can change its posture via a joint 324, and a touch signal probe 330 rotatably connected to the tip end of the movable arm 320.

The movable arm 320 is formed with a first arm 321, a second arm 322 and a third arm 323, these arms being connected so as to change their angles via universal joints 325 and 326. The touch signal probe 330 that abuts on the workpiece W and detects the workpiece surface is connected to the tip end of the third arm 323 via a universal joint 327.

As shown in FIG. 3, the arithmetic processor 400 includes a reference point coordinate calculator 410, a reference point coordinate storage 420, a position/posture recognizer 430, a coordinate system transformer 440, a measurement data storage 450 and a workpiece form analyzer 460.

The configuration of the reference point coordinate calculator 410 and a reference point coordinate calculating method (the operation of the reference point coordinate calculator) will be described with reference to FIGS. 4 to 7.

Figure 4:
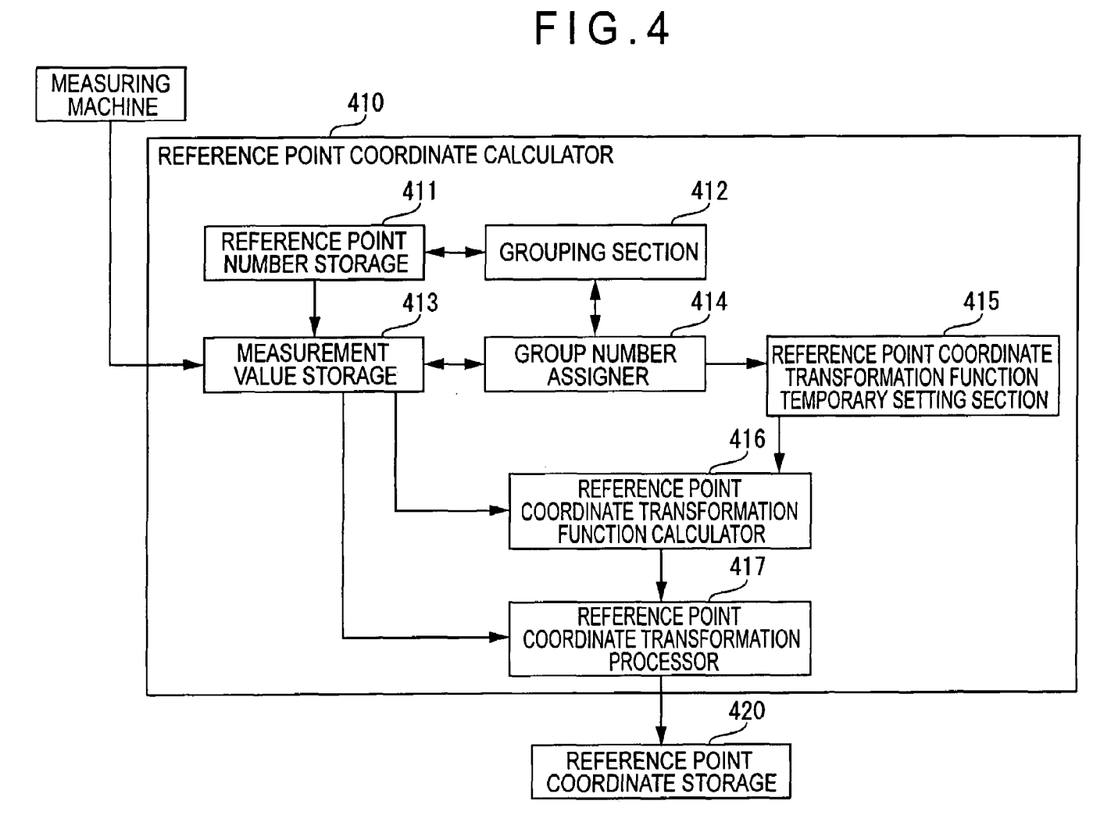
FIG. 4 is an illustration showing the configuration of a reference coordinate calculator of the aforesaid embodiment.
Figure 6:
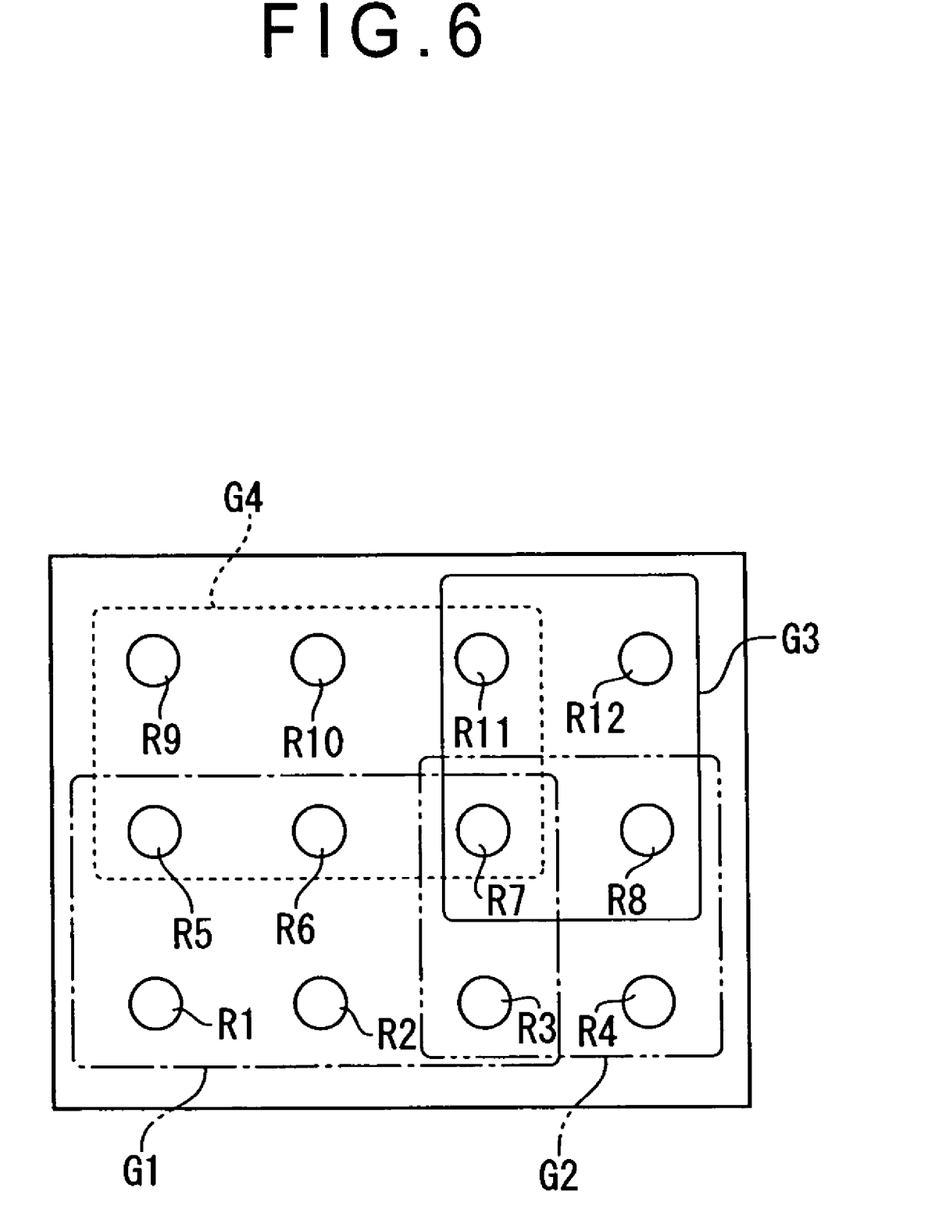
FIG. 6 is an illustration showing a grouping example when positions of reference points are measured.
Figure 7:
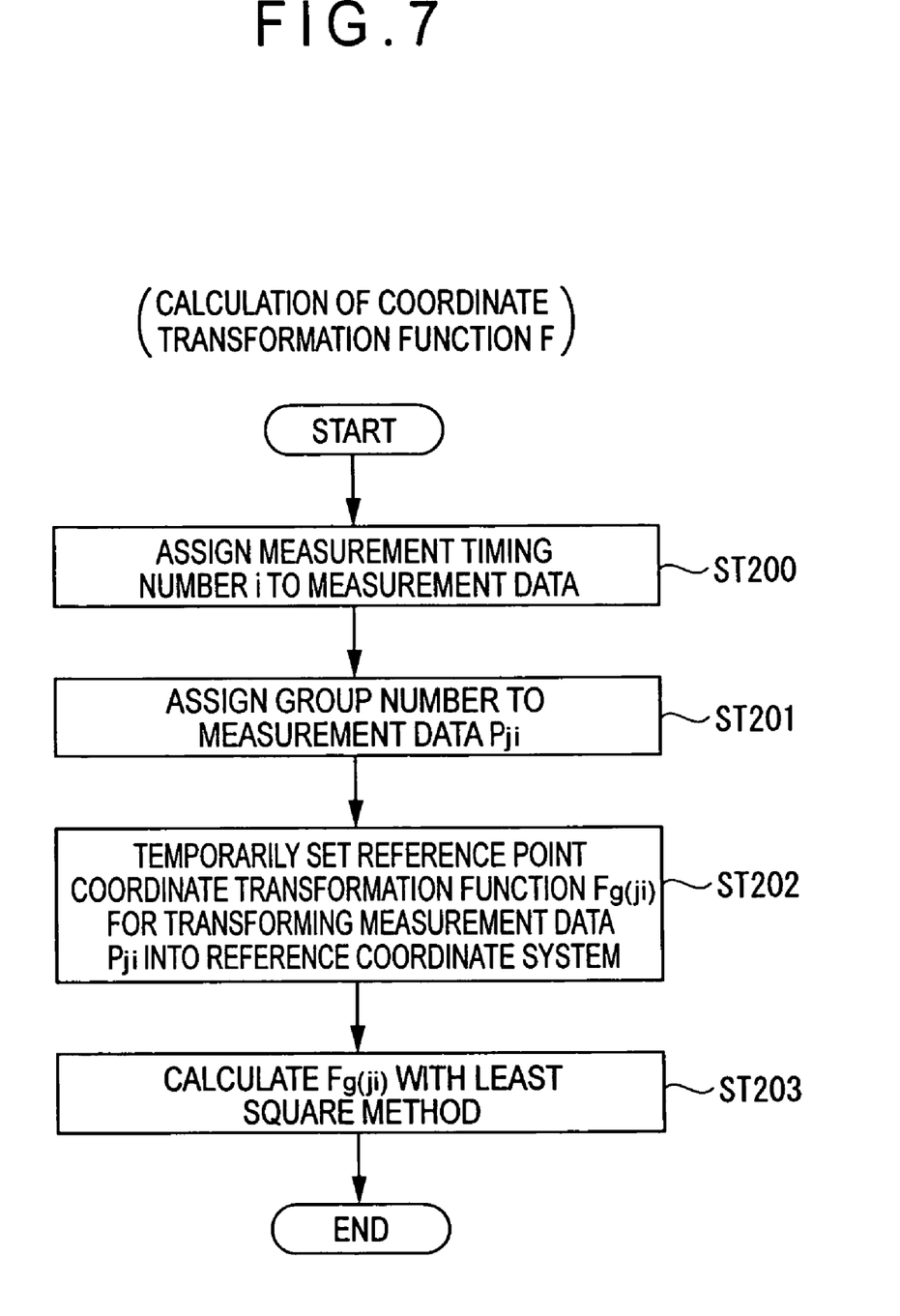
FIG. 7 is a flowchart showing steps for calculating a coordinate transformation function for each group.

FIG. 4 is an illustration showing the configuration of the reference point coordinate calculator 410. In addition, FIG. 5 is a flowchart showing steps for calculating the reference point coordinates, FIG. 6 is an illustration showing an example of grouping when the positions of the reference points are measured, and FIG. 7 is a flowchart showing steps for calculating a reference point coordinate transformation function for each group.

Hereinafter, according to the configuration shown in FIG. 4, the processing operations for executing the steps shown in FIGS. 5 and 7 will be described.

Figure 5:
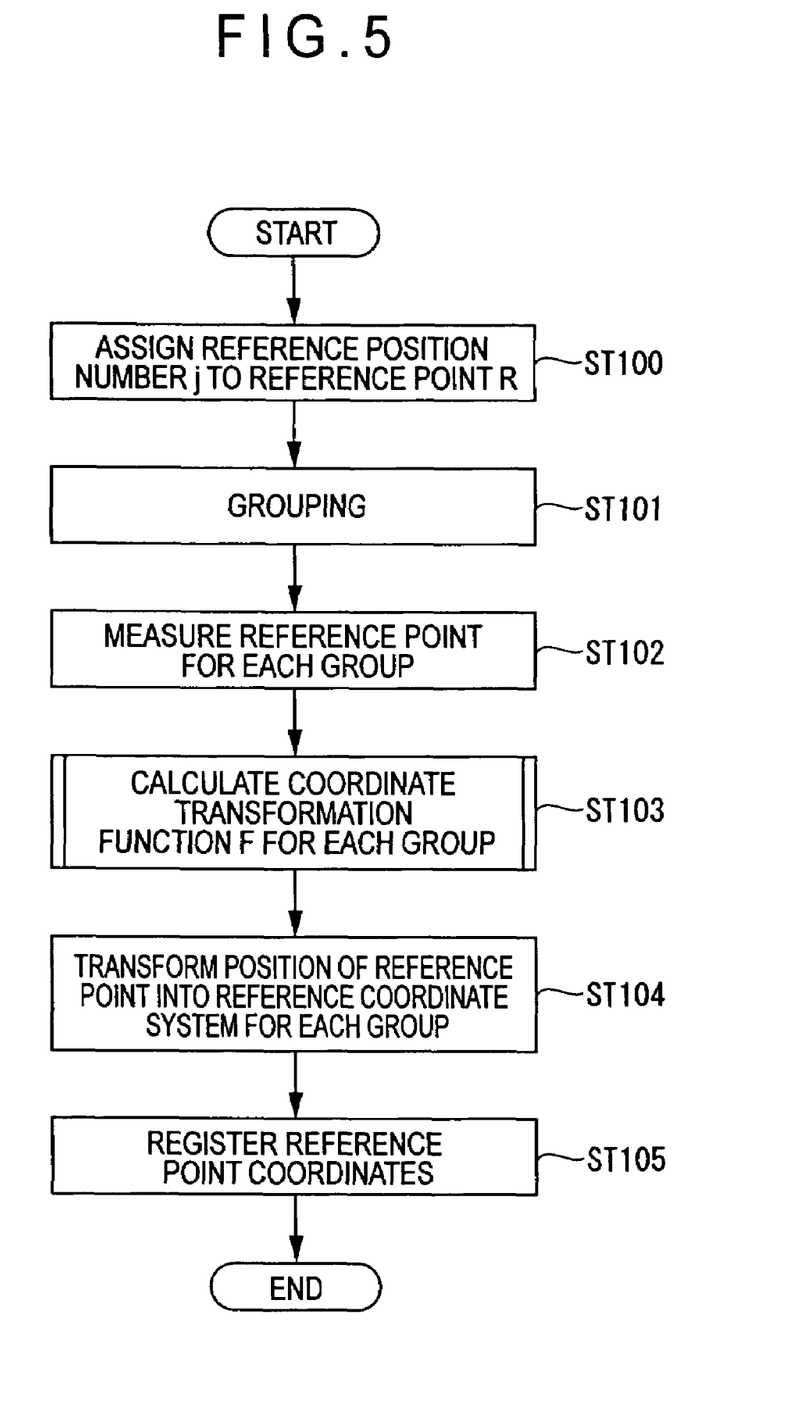
FIG. 5 is a flowchart showing steps for calculating reference point coordinates of the aforesaid embodiment.

In step ST100 in FIG. 5, reference position number j (j=1, 2, 3 . . . ) is assigned (numbered) to each reference point R.

For example, as shown in FIG. 1, a number is sequentially assigned to each reference point starting with $R_1$. The reference position number j assigned to each reference point R is stored in a reference point number storage 411.

In step ST101, the reference points R on the reference plate 200 are grouped for each measurable area (measurement area) by the measuring machine 300 without necessity of moving the measuring machine 300 (a grouping step). In this time, the reference points R are grouped so that each group shares two or more common reference points R with at least one of other groups. For example, in FIG. 6, the reference points R3 and R7 are shared by groups G1 and G2.

Such grouping processing is executed by a program preset in a grouping section 412, i.e., the program is incorporated in the grouping section 412 for automatically executing the processing when the arrangement of the reference points R and the measurement area of the measuring machine 300 are input.

In step ST102, coordinates where the position of each reference point R is reflected on the reference plane is obtained as a measurement value for each group.

Specifically, the center point of the reference ball 220 is calculated with the reference ball 220 being fitted in the hole 210, and then the coordinate point where the center point of the reference ball 220 is reflected on the reference plane determined by the three points on the reference plate 200, is obtained as the measurement value.

For instance, in FIG. 6, in order to obtain coordinates of the reference points ($R_1$, $R_2$, $R_3$, $R_5$, $R_6$, $R_7$) of the group G1, (1) the reference plane (common plane) is determined for measuring the reference points ($R_1$ to $R_3$, $R_5$ to $R_7$) of group G1 by the three points on the surface of the reference plate 200, (2) the center point of the reference ball 220 is obtained by four points on the surface of the reference ball 220 fitted in the reference point R (e.g. the reference point $R_1$), and (3) the reference point coordinates Cr of the reference point R of the group G1 is obtained as the measurement value by reflecting the center point of the reference ball 220 on the reference plane.

As for other groups as well as other reference points R, a coordinate point (reference point coordinates Cr) where the reference point R is reflected on the reference plane is obtained as the measurement value in the manner described above.

In order to obtain the common plane (reference plane) for each group, for instance, the three points nonlinearly located on the reference plate are measured as shown by $B_1$ to $B_3$ in FIG. 1, and a plane is determined by the measurement values.

And, in order to obtain the center point of the reference ball 220, four points on the surface of the reference ball 220 may be obtained, so that the center of the reference ball 220 is obtained by the measurement values of the four points, or three points on the surface of the reference ball 220 may be measured when the diameter (or the radius) of the reference ball 220 is known, so that the center point of the reference ball 220 is obtained by the measurement values of the three points and the diameter.

When grouping as shown in FIG. 6, since the groups have the common reference points, the reference points $R_3$, $R_5$, $R_6$, $R_8$, $R_{11}$ are measured two times and the reference point $R_7$ is measured four times while the reference points $R_1$, $R_2$, $R_4$, $R_9$, $R_{10}$, $R_{12}$ are measured only one time.

At this time, because the origin point in measurement is varied on account of the position of the measuring machine 300 itself, even when measuring the reference point coordinates Cr of the common reference point R is shared by adjacent groups, the reference point coordinates Cr (x-coordinate, y-coordinate) of the common reference point R may be varied such that the one indicates (20, 20) while the other one indicates (30.01, 10).

The measurement values obtained by the measurement described above are sequentially stored in the measurement value storage 413, and when being stored, the measurement values each are associated with the reference point number j stored in the reference point number storage 411.

In step ST103, a reference point coordinate transformation function F is calculated for each group, which transforms the measurement value obtained by measuring the reference point R into the coordinate point on the reference coordinate system.

This step will be described with reference to the flowchart in FIG. 7.

While the measurement value (the reference point coordinates Cr) of the reference point R obtained in measurement is associated with the reference point number j and stored in the measurement value storage 413, in step ST200 in FIG. 7, a measurement timing number i is assigned to the measurement value obtained by measuring each reference point R. Namely, the measurement timing number i is assigned to the measurement values redundantly obtained as the common reference point R shared by the groups. Note that, the measurement timing number i is equal to 1, 2, ... $n_j$, the $n_j$ indicates the number of data for the reference point $R_j$ redundantly obtained. Then, an identification number $P_{ji}$ is assigned to the measurement value P in which j indicates the reference position number and i indicates the measurement timing number. Here, assume that the P indicates a two-dimensional vector with an x-coordinate value and a y-coordinate value.

In step ST201, the number of the group to which the measurement value $P_{ji}$ belongs is assigned to the measurement value $P_{ji}$.

The group number is assigned by a group number assigner 414 in response to the data output from the measurement value storage 413.

The group number assigner 414 automatically creates a table in which the reference point number j and the measurement timing number i are associated with the group (G1, G2 ...) to which the measurement value $P_{ji}$ belongs, according to grouping with the grouping section 412. The group number assigner 414 assigns a group number g(ji) to the measurement value $P_{ji}$ by referring to the table. Note that, the g(ji) is a function expressing the group number (i.e. G1, G2 ...) to which the measurement value $P_{ji}$ belongs, the j defining the reference point number and the i defining the measurement timing number.

In particular, the grouping section 412 groups the reference points R into the groups G1, G2 ... such that the common reference points R are shared by the groups, and the group number assigner 414 assigns the group number g(ji) for identifying which group provides the measurement value $P_{ji}$ with the j-th reference point number and the i-th measurement timing number.

Next, in step ST202, the reference point coordinate transformation function for transforming the measurement value $P_{ji}$ into a value on the reference coordinate system is temporarily set as $F_{g(ji)}$.

Note that, the reference point coordinate transformation function F is a matrix reflecting a mapping in which the measurement value is shifted to the reference coordinate system from a coordinate system on which the reference points R are measured by the measuring machine 300. For example, the function F is expressed by a following (Equation 1) due to parallel movement and rotational operation, and input and stored in the reference point coordinate transformation function temporary setting section 415.

In a case of (Equation 1), the parallel movement corresponds to the movement of the origin point along with the movement of the measuring machine 300 while the rotational operation corresponds to inclination (a relative posture) of the measuring machine 300 against the reference plane.

$$F(x, y) = \begin{pmatrix} \cos\theta & \sin\theta \\ -\sin\theta & \cos\theta \end{pmatrix} \begin{pmatrix} x - x_0 \\ y - y_0 \end{pmatrix} \quad \text{(Equation 1)}$$

In step ST203, the reference point coordinate transformation function $F_{g(ji)}$ is calculated.

To be more specific, the calculation is conducted by adjusting the reference point coordinate transformation function $F_{g(ji)}$ temporarily set in the reference point coordinate transformation temporary setting section 415 so that the values "$Fg_{(ji)}(P_{ji})$", in which the coordinates of the reference point $R_j$ are transformed according to the measurement data $P_{ji}$ (note that, i=1, 2, ... $n_j$, in which the $n_j$ represents the number of data redundantly obtained for the reference point $R_j$) redundantly measured and obtained with the different groups, become the same value (or extremely approximate values). Namely, using the least square method, the reference point coordinate transformation function $F_{g(ji)}$ is obtained by making the sum of squares of deviations the least as follows.

$$e_{ji} = F_{g(ji)}(P_{ji}) - \frac{\sum_{i=1}^{n_j} F_{g(ji)}(P_{ji})}{n_j} \quad \text{(Equation 2)}$$

$$\sum_{j=1}^{max} \sum_{i=1}^{n_j} |e_{ji}|^2 \to \min \quad \text{(Equation 3)}$$

This processing (step ST203) is executed in such manner that a reference point coordinate transformation function calculator 416 substitutes the measurement value stored in the measurement value storage 413 for the Equation 1 temporarily set in the reference point coordinate transformation function temporary setting section 415, and then the Equations 2 and 3 are applied.

In step ST104 in FIG. 5, a reference point coordinate transformation processor 417 executes the step for transforming the measurement value $P_{ji}$ into a value on the reference coordinate system according to each group (G1, G2 ...) with the use of the coordinate transformation function $F_{g(ji)}$ calculated in step ST103.

In step ST105, the reference point coordinates Cr of each reference point R calculated with transformation in step ST104 are registered on the reference point coordinate storage 420. Note that, when a plurality of post-transformation values for the single reference point R, the arithmetic mean of those is employed.

Then, measurement of the workpiece using the reference point coordinates of the reference coordinate system stored in the reference point coordinate storage 420 will be described below in addition to the configuration of the arithmetic processor 400.

The reference point coordinate storage 420 has stored the reference point coordinates Cr calculated by the reference point coordinate calculator 410 for each reference point R, with the reference point coordinates Cr making a pair with the number j (j=1, 2 ...) which is assigned to each reference point R.

The position/posture recognizer 430 recognizes the position of the measuring machine 300 on the reference plate 200 and the posture of the measuring machine 300 (tilt angle etc. against the reference plate 200). The position/posture recognizer 430 is connected to a reference plane calculator 431 that calculates the relative posture of the reference plane and the measuring machine 300 based on the result of measurement in which the points on the reference plate 200 (for example, $B_1$ to $B_3$ in FIG. 1, which are not linearly located) are measured by the measuring machine 300.

The position/posture recognizer 430 recognizes the position and the posture of the measuring machine 300 based on the reference plane calculated by the reference plane calculator 431 and the coordinate values obtained when measuring the two reference points R.

The coordinate system transformer 440 transforms the measurement value obtained when the measuring machine 300 placed on the reference plate 200 measures the workpiece W into the coordinate point on the reference coordinate system.

Additionally, the coordinate system transformer 440 is connected to a measurement point coordinate transformation function calculator 441 that calculates a measurement point coordinate transformation function for transforming the measurement value measured by measuring machine 300 into a value on the reference coordinate system based on the position and the posture of the measuring machine 300 recognized by the position/posture recognizer 430.

The measurement data storage 450 stores the value in which the measurement value obtained when measuring the workpiece W is transformed into the coordinate point on the reference coordinate system with the coordinate system transformer 440, as measurement data.

The workpiece form analyzer 460 performs the form analysis of the workpiece based on the measurement data stored in the measurement data storage 450. For instance, comparative evaluation may be performed with the master workpiece or the design value.

Now, the measurement operation of the workpiece by the form measuring machine 100 will be described.

First, the coordinate value of the reference point coordinates Cr on the reference coordinate system is obtained for each reference point R provided on the reference plate 200, and registered in the reference point coordinate storage 420. This processing is performed in the manner described above with reference to FIGS. 4 to 7.

The workpiece W (the subject to be measured) is placed on the reference plate 200 and the measuring machine 300 is placed at the position corresponding to the portion to be measured of the workpiece W.

Before the workpiece W is actually measured, the three arbitrary points (for example, $B_1$ to $B_3$, which are not linearly located) and the two reference points R on the reference plate 200 are measured by the measuring machine 300 in order to recognize the position and the posture of the measuring machine 300. To be more specific about measuring the reference points R, the center point of the reference ball 220 is obtained by measuring the four points on the surface of the reference ball 220 with the reference ball 220 fitted in the hole 210, and then the point (the reference point coordinates) in which the center point of the reference ball 220 is reflected on the reference plane is obtained.

Based on the result when the three points on the reference plate 200 are measured, the relative posture of the reference plane and the measuring machine 300 is obtained by the reference plane calculator 431. Then, the values (reference point coordinates) obtained when measuring the two reference points R are compared with the reference point coordinates on the reference coordinate system stored (registered) in the reference point coordinate storage 420, and the position and the posture of the measuring machine 300 are obtained by the position/posture recognizer 430.

In accordance with the position and the posture of the measuring machine 300 recognized by the position/posture recognizer 430, the measurement point coordinate transformation function for transforming the measurement value measured by the measuring machine 300 into a value on the reference coordinate system is calculated by the measurement point coordinate transformation function calculator 441. The measurement point coordinate transformation function which is calculated is output to the coordinate system transformer 440.

Next, the workpiece W is actually measured by the measuring machine 300.

At this time, the measurement is conducted for each area where the measuring machine 300 can perform measurement at the current position without the position of the measuring machine 300 being changed.

The measurement value obtained by measuring the workpiece W is output to the coordinate system transformer 440, so that the measurement value is transformed into a point on the reference coordinate system by the coordinate system transformer 440 using the measurement point coordinate transformation function.

The value transformed into the point on the reference coordinate system is stored in the measurement data storage 450.

In a case where the position of the measuring machine 300 is changed, the three points on the reference plate 200 and the two reference points R are measured again, and then the position and the posture of the measuring machine 300 are recognized.

The workpiece form analyzer 460 performs the form analysis of the workpiece W based on the measurement data stored in the measurement data storage 450. For example, comparison may be performed with the master workpiece or the design value.

According to the form measuring machine 100 with such configuration, the following advantages can be obtained.

(1) By obtaining the measurement value coordinate transformation function F for each group after the respective reference points R are grouped and measured, the positions of the reference points R in the large area can be calculated by the measuring machine 300 having narrow measurement area, as the coordinate points on the reference coordinate system, and registered. At this time, because the coordinates of the reference points R can be obtained with the use of the measuring machine 300 for measuring the workpiece W, the cost can remarkably be lowered as compared to employing the large measuring machine.

(2) In order to obtain the coordinates (reference point coordinates) of the reference points R as a single point on the reference coordinate system, since it is enough to obtain the coordinate transformation function F for each group after the respective reference points R are grouped and measured, the size of the area where the reference points R are provided may be extended as required without any restriction. For example, even though there is restriction for the measurable area with a laser measuring machine, any workpiece (e.g., a car or an airplane) can be measured no matter how big it is according to the present embodiment.

(3) In the present embodiment, the coordinate points in which the positions of the reference points are reflected on the reference plane are defined as the reference point coordinates, so that the reference point coordinates arranged on the common plane are obtained. Accordingly, even when the common reference points shared by the groups are measured and the result of measurement which is obtained based on the coordinates of the common reference points for each group are combined as points on the standardized coordinate system, the common reference points shared by the groups can be two or more. In general, although the number n of the common reference points are required by the groups in the n-dimensional coordinate system, the same advantages as that the three common reference points are shared by the groups can actually be attained by measuring not only the two common reference points shared by the groups as well as the common plane employed in each group. As mentioned above, since only the two common reference points are required to be shared by the groups, the requirement is eased up for grouping as compared to the case of the three common reference points, thus easily grouping the reference points.

Note that, the present invention is not limited to the above-described embodiment, and may be modified or improved as long as an object of the present invention can be achieved.

The reference point on the reference plate is not limited to be arranged in the grid pattern, and may be arranged in a random manner.

As the method for grouping the reference points, the three common reference points may be shared with the other group when grouping. In such case, the center of the reference ball must not be reflected on the reference plane and the center of the reference ball 220 is simply employed as the reference point coordinates. Owing to this, the step for calculating the reference plane by measuring the three arbitrary points on the reference plane can be omitted. When the reference points are the point on the two-dimensional coordinate system such as the reference points used by an image measuring machine, the two reference points are enough to be shared by the groups.

As shown in FIG. 6, when the reference points are grouped, the group is preferable to form a closed-loop as a whole. For example, if the groups have the start-point group and the end-point group, by calculating the coordinate transformation function based on the common reference points shared by the groups, the standardized reference coordinate system may be generated since all of the groups are linked (associated) with each other for eliminating the accumulation of errors, though the start-point group may not possibly be standardized with the end-point group because the errors are gradually accumulated.

When the position of the reference point R is directly employed as the reference point coordinates without being reflected on the common plane, in order to recognize the position and the posture of the measuring machine, the step for identifying the reference plane may be omitted, so that the position of the measuring machine is recognized by simply measuring the three reference points.

The configuration of the measuring machine is not limited particularly, and for instance, a laser measuring machine may be employed. Owing to this, the measurement area of the laser measuring machine, which originally has a large measurement area, can further be extended. In such case, intervals of the reference points may widely be secured in accordance with the measurement area of the laser measuring machine. Additionally, when the point on the two-dimensional coordinate system is employed as the reference point, the measuring machine should be a two-dimensional sensor such as the image measuring machine.

The priority application Number JP2004-232401 upon which this patent application is based is hereby incorporated by reference.

What is claimed is:

1. A reference coordinate calculating method for obtaining positions of a plurality of reference points arranged on a reference plate having a larger area than a measurement area of a measuring machine as coordinate points on a standardized reference coordinate system, the method comprising the steps of:
   a grouping step in which the reference points included in a measurable area of the measuring machine without a position of the measuring machine being moved are grouped as a group so that one of the groups in which the plurality of reference points are grouped shares at least three of the reference points with at least the other one of the groups;
   a measuring step in which the measuring machine measures the positions of the reference points for each of the groups;
   a reference point coordinate transformation function calculating step in which a reference point coordinate transformation function is calculated for each of the groups, the reference point coordinate transformation function respectively transforming the positions of the reference points which are shared by different groups and obtained by measuring the reference points in the different groups into the same or extremely approximate coordinate points; and
   a reference point coordinate transformation processing step in which coordinates of the positions of the reference points measured for each of the groups are transformed with the reference point coordinate transformation function calculated for each of the groups.

2. The reference coordinate calculating method according to claim 1, wherein the reference point coordinate transformation function calculating step obtains a deviation between: each of the coordinate points in which the coordinates of the positions obtained by measuring the common reference points in the different groups are respectively transformed with the coordinate transformation function; and an arithmetic mean of the coordinate points, and calculates the reference point coordinate transformation function that makes the sum of squares of the deviation the least.

3. A reference coordinate calculating method for obtaining positions of a plurality of reference points arranged on a reference plate having a larger area than a measurement area of a measuring machine as coordinate points on a standardized reference coordinate system, the method comprising the steps of:
   a grouping step in which the reference points included in a measurable area of the measuring machine without a position of the measuring machine being moved are grouped as a group so that one of the groups in which the plurality of reference points are grouped shares at least two of the reference points and a common plane with at least the other one of the groups;
   a measuring step in which the measuring machine measures the positions of the reference points as well as the common plane for each of the groups;
   a reference point coordinate transformation function calculating step in which a reference point coordinate transformation function is calculated for each of the groups, the reference point coordinate transformation function respectively transforming the positions of the reference points which are shared by different groups and obtained by measuring the reference points as well as the common plane in the different groups into the same or extremely approximate coordinate points; and
   a reference point coordinate transformation processing step in which coordinates of the positions of the reference points measured for each of the groups are transformed with the reference point coordinate transformation function calculated for each of the groups.

4. The reference coordinate calculating method according to claim 3, wherein the positions of the reference points are positions reflected on the common plane.

5. The reference coordinate calculating method according to claim 3, wherein the reference point coordinate transformation function calculating step obtains a deviation between: each of the coordinate points in which the coordinates of the positions obtained by measuring the common reference points in the different groups are respectively transformed with the coordinate transformation function; and an arithmetic mean of the coordinate points, and calculates the reference point coordinate transformation function that makes the sum of squares of the deviation the least.

6. A reference coordinate calculating method for obtaining positions of a plurality of reference points of a two-dimensional coordinate system arranged on a reference plane having a larger area than a measurement area of a measuring machine as coordinate points on a standardized reference coordinate system, the method comprising the steps of:
a grouping step in which the reference points included in a measurable area of the measuring machine without a position of the measuring machine being moved are grouped as a group so that one of the groups in which the plurality of reference points are grouped shares at least two of the reference points with at least the other one of the groups;
a measuring step in which the measuring machine measures the positions of the reference points for each of the groups;
a reference point coordinate transformation function calculating step in which a reference point coordinate transformation function is calculated for each of the groups, the reference point coordinate transformation function respectively transforming the positions of the reference points which are shared by different groups and obtained by measuring the reference points in the different groups into the same or extremely approximate coordinate points; and
a reference point coordinate transformation processing step in which coordinates of the positions of the reference points measured for each of the groups are transformed with the reference point coordinate transformation function calculated for each of the groups.

7. The reference coordinate calculating method according to claim 6, wherein the reference point coordinate transformation function calculating step obtains a deviation between: each of the coordinate points in which the coordinates of the positions obtained by measuring the common reference points in the different groups are respectively transformed with the coordinate transformation function; and an arithmetic mean of the coordinate points, and calculates the reference point coordinate transformation function that makes the sum of squares of the deviation the least.

8. A reference coordinate calculating program for instructing a computing unit to execute the respective steps of a reference coordinate calculating method for obtaining positions of a plurality of reference points arranged on a reference plate having a larger area than a measurement area of a measuring machine as coordinate points on a standardized reference coordinate system,
the method including the steps of:
a grouping step in which the reference points included in a measurable area of the measuring machine without a position of the measuring machine being moved are grouped as a group so that one of the groups in which the plurality of reference points are grouped shares at least three of the reference points with at least the other one of the groups;
a measuring step in which the measuring machine measures the positions of the reference points for each of the groups;
a reference point coordinate transformation function calculating step in which a reference point coordinate transformation function is calculated for each of the groups, the reference point coordinate transformation function respectively transforming the positions of the reference points which are shared by different groups and obtained by measuring the reference points in the different groups into the same or extremely approximate coordinate points; and
a reference point coordinate transformation processing step in which coordinates of the positions of the reference points measured for each of the groups are transformed with the reference point coordinate transformation function calculated for each of the groups.

9. A reference coordinate calculating program for instructing a computing unit to execute the respective steps of a reference coordinate calculating method for obtaining positions of a plurality of reference points arranged on a reference plate having a larger area than a measurement area of a measuring machine as coordinate points on a standardized reference coordinate system,
the method including the steps of:
a grouping step in which the reference points included in a measurable area of the measuring machine without a position of the measuring machine being moved are grouped as a group so that one of the groups in which the plurality of reference points are grouped shares at least two of the reference points and a common plane with at least the other one of the groups;
a measuring step in which the measuring machine measures the positions of the reference points as well as the common plane for each of the groups;
a reference point coordinate transformation function calculating step in which a reference point coordinate transformation function is calculated for each of the groups, the reference point coordinate transformation function respectively transforming the positions of the reference points which are shared by different groups and obtained by measuring the reference points as well as the common plane in the different groups into the same or extremely approximate coordinate points; and
a reference point coordinate transformation processing step in which coordinates of the positions of the reference points measured for each of the groups are transformed with the reference point coordinate transformation function calculated for each of the groups.

10. A reference coordinate calculating program for instructing a computing unit to execute the respective steps of a reference coordinate calculating method for obtaining positions of a plurality of reference points of a two-dimensional coordinate system arranged on a reference plane having a larger area than a measurement area of a measuring machine as coordinate points on a standardized reference coordinate system,
the method including the steps of:
a grouping step in which the reference points included in a measurable area of the measuring machine without a position of the measuring machine being moved are grouped as a group so that one of the groups in which the plurality of reference points are grouped shares at least two of the reference points with at least the other one of the groups;

a measuring step in which the measuring machine measures the positions of the reference points for each of the groups;

a reference point coordinate transformation function calculating step in which a reference point coordinate transformation function is calculated for each of the groups, the reference point coordinate transformation function respectively transforming the positions of the reference points which are shared by different groups and obtained by measuring the reference points in the different groups into the same or extremely approximate coordinate points; and a reference point coordinate transformation processing step in which coordinates of the positions of the reference points measured for each of the groups are transformed with the reference point coordinate transformation function calculated for each of the groups.

11. A recording medium storing a reference coordinate calculating program in a manner readable by a computing unit, the reference coordinate calculating program instructing a computing unit to execute the respective steps of a reference coordinate calculating method for obtaining positions of a plurality of reference points arranged on a reference plate having a larger area than a measurement area of a measuring machine as coordinate points on a standardized reference coordinate system, the method including the steps of:

a grouping step in which the reference points included in a measurable area of the measuring machine without a position of the measuring machine being moved are grouped as a group so that one of the groups in which the plurality of reference points are grouped shares at least three of the reference points with at least the other one of the groups;

a measuring step in which the measuring machine measures the positions of the reference points for each of the groups;

a reference point coordinate transformation function calculating step in which a reference point coordinate transformation function is calculated for each of the groups, the reference point coordinate transformation function respectively transforming the positions of the reference points which are shared by different groups and obtained by measuring the reference points in the different groups into the same or extremely approximate coordinate points; and a reference point coordinate transformation processing step in which coordinates of the positions of the reference points measured for each of the groups are transformed with the reference point coordinate transformation function calculated for each of the groups.

12. A recording medium storing a reference coordinate calculating program in a manner readable by a computing unit, the reference coordinate calculating program instructing a computing unit to execute the respective steps of a reference coordinate calculating method for obtaining positions of a plurality of reference points arranged on a reference plate having a larger area than a measurement area of a measuring machine as coordinate points on a standardized reference coordinate system, the method including the steps of:

a grouping step in which the reference points included in a measurable area of the measuring machine without a position of the measuring machine being moved are grouped as a group so that one of the groups in which the plurality of reference points are grouped shares at least two of the reference points and a common plane with at least the other one of the groups;

a measuring step in which the measuring machine measures the positions of the reference points as well as the common plane for each of the groups;

a reference point coordinate transformation function calculating step in which a reference point coordinate transformation function is calculated for each of the groups, the reference point coordinate transformation function respectively transforming the positions of the reference points which are shared by different groups and obtained by measuring the reference points as well as the common plane in the different groups into the same or extremely approximate coordinate points; and a reference point coordinate transformation processing step in which coordinates of the positions of the reference points measured for each of the groups are transformed with the reference point coordinate transformation function calculated for each of the groups.

13. A recording medium storing a reference coordinate calculating program in a manner readable by a computing unit, the reference coordinate calculating program instructing a computing unit to execute the respective steps of a reference coordinate calculating method for obtaining positions of a plurality of reference points of a two-dimensional coordinate system arranged on a reference plane having a larger area than a measurement area of a measuring machine as coordinate points on a standardized reference coordinate system, the method including the steps of:

a grouping step in which the reference points included in a measurable area of the measuring machine without a position of the measuring machine being moved are grouped as a group so that one of the groups in which the plurality of reference points are grouped shares at least two of the reference points with at least the other one of the groups;

a measuring step in which the measuring machine measures the positions of the reference points for each of the groups;

a reference point coordinate transformation function calculating step in which a reference point coordinate transformation function is calculated for each of the groups, the reference point coordinate transformation function respectively transforming the positions of the reference points which are shared by different groups and obtained by measuring the reference points in the different groups into the same or extremely approximate coordinate points; and a reference point coordinate transformation processing step in which coordinates of the positions of the reference points measured for each of the groups are transformed with the reference point coordinate transformation function calculated for each of the groups.

14. A reference plate having a plurality of reference points of which positions are obtained as coordinate points on a standardized reference coordinate system with a reference coordinate calculating method for obtaining positions of a plurality of reference points arranged on a reference plate having a larger area than a measurement area of a measuring machine as coordinate points on a standardized reference coordinate system, the method including the steps of:

a grouping step in which the reference points included in a measurable area of the measuring machine without a position of the measuring machine being moved are grouped as a group so that one of the groups in which the plurality of reference points are grouped shares at least three of the reference points with at least the other one of the groups;

a measuring step in which the measuring machine measures the positions of the reference points for each of the groups;

a reference point coordinate transformation function calculating step in which a reference point coordinate transformation function is calculated for each of the groups, the reference point coordinate transformation function respectively transforming the positions of the reference points which are shared by different groups and obtained by measuring the reference points in the different groups into the same or extremely approximate coordinate points; and a reference point coordinate transformation processing step in which coordinates of the positions of the reference points measured for each of the groups are transformed with the reference point coordinate transformation function calculated for each of the groups.

15. A reference plate having a plurality of reference points of which positions are obtained as coordinate points on a standardized reference coordinate system with a reference coordinate calculating method for obtaining positions of a plurality of reference points arranged on a reference plate having a larger area than a measurement area of a measuring machine as coordinate points on a standardized reference coordinate system, the method including the steps of:

a grouping step in which the reference points included in a measurable area of the measuring machine without a position of the measuring machine being moved are grouped as a group so that one of the groups in which the plurality of reference points are grouped shares at least two of the reference points and a common plane with at least the other one of the groups;

a measuring step in which the measuring machine measures the positions of the reference points as well as the common plane for each of the groups;

a reference point coordinate transformation function calculating step in which a reference point coordinate transformation function is calculated for each of the groups, the reference point coordinate transformation function respectively transforming the positions of the reference points which are shared by different groups and obtained by measuring the reference points as well as the common plane in the different groups into the same or extremely approximate coordinate points; and a reference point coordinate transformation processing step in which coordinates of the positions of the reference points measured for each of the groups are transformed with the reference point coordinate transformation function calculated for each of the groups.

16. A reference plate having a plurality of reference points of which positions are obtained as coordinate points on a standardized reference coordinate system with a reference coordinate calculating method for obtaining positions of a plurality of reference points of a two-dimensional coordinate system arranged on a reference plane having a larger area than a measurement area of a measuring machine as coordinate points on a standardized reference coordinate system, the method including the steps of:

a grouping step in which the reference points included in a measurable area of the measuring machine without a position of the measuring machine being moved are grouped as a group so that one of the groups in which the plurality of reference points are grouped shares at least two of the reference points with at least the other one of the groups;

a measuring step in which the measuring machine measures the positions of the reference points for each of the groups;

a reference point coordinate transformation function calculating step in which a reference point coordinate transformation function is calculated for each of the groups, the reference point coordinate transformation function respectively transforming the positions of the reference points which are shared by different groups and obtained by measuring the reference points in the different groups into the same or extremely approximate coordinate points; and a reference point coordinate transformation processing step in which coordinates of the positions of the reference points measured for each of the groups are transformed with the reference point coordinate transformation function calculated for each of the groups.

17. A form measuring machine, comprising:

a reference plate; and a measuring machine movable on the reference plate, the reference plate having a plurality of reference points of which positions are obtained as coordinate points on a standardized reference coordinate system with a reference coordinate calculating method for obtaining positions of a plurality of reference points arranged on a reference plate having a larger area than a measurement area of a measuring machine as coordinate points on a standardized reference coordinate system, the method including the steps of:

a grouping step in which the reference points included in a measurable area of the measuring machine without a position of the measuring machine being moved are grouped as a group so that one of the groups in which the plurality of reference points are grouped shares at least three of the reference points with at least the other one of the groups;

a measuring step in which the measuring machine measures the positions of the reference points for each of the groups;

a reference point coordinate transformation function calculating step in which a reference point coordinate transformation function is calculated for each of the groups, the reference point coordinate transformation function respectively transforming the positions of the reference points which are shared by different groups and obtained by measuring the reference points in the different groups into the same or extremely approximate coordinate points; and a reference point coordinate transformation processing step in which coordinates of the positions of the reference points measured for each of the groups are transformed with the reference point coordinate transformation function calculated for each of the groups.

18. A form measuring machine, comprising:

a reference plate; and a measuring machine movable on the reference plate, the reference plate having a plurality of reference points of which positions are obtained as coordinate points on a standardized reference coordinate system with a reference coordinate calculating method for obtaining positions of a plurality of reference points arranged on a reference plate having a larger area than a measurement area of a measuring machine as coordinate points on a standardized reference coordinate system, the method including the steps of:

a grouping step in which the reference points included in a measurable area of the measuring machine without a position of the measuring machine being moved are grouped as a group so that one of the groups in which the plurality of reference points are grouped shares at least two of the reference points and a common plane with at least the other one of the groups;

a measuring step in which the measuring machine measures the positions of the reference points as well as the common plane for each of the groups;

a reference point coordinate transformation function calculating step in which a reference point coordinate transformation function is calculated for each of the groups, the reference point coordinate transformation function respectively transforming the positions of the reference points which are shared by different groups and obtained by measuring the reference points as well as the common plane in the different groups into the same or extremely approximate coordinate points; and a reference point coordinate transformation processing step in which coordinates of the positions of the reference points measured for each of the groups are transformed with the reference point coordinate transformation function calculated for each of the groups.

19. A form measuring machine, comprising:

a reference plate; and a measuring machine movable on the reference plate, the reference plate having a plurality of reference points of which positions are obtained as coordinate points on a standardized reference coordinate system with a reference coordinate calculating method for obtaining positions of a plurality of reference points of a two-dimensional coordinate system arranged on a reference plane having a larger area than a measurement area of a measuring machine as coordinate points on a standardized reference coordinate system, the method including the steps of:

a grouping step in which the reference points included in a measurable area of the measuring machine without a position of the measuring machine being moved are grouped as a group so that one of the groups in which the plurality of reference points are grouped shares at least two of the reference points with at least the other one of the groups;

a measuring step in which the measuring machine measures the positions of the reference points for each of the groups;

a reference point coordinate transformation function calculating step in which a reference point coordinate transformation function is calculated for each of the groups, the reference point coordinate transformation function respectively transforming the positions of the reference points which are shared by different groups and obtained by measuring the reference points in the different groups into the same or extremely approximate coordinate points; and a reference point coordinate transformation processing step in which coordinates of the positions of the reference points measured for each of the groups are transformed with the reference point coordinate transformation function calculated for each of the groups.

* * * * *